(12) United States Patent
Watanabe et al.

(10) Patent No.: US 7,150,895 B2
(45) Date of Patent: Dec. 19, 2006

(54) METHOD OF PRODUCING A MAGNETIC RECORDING MEDIUM AND A MAGNETIC RECORDING MEDIUM FORMED THEREBY

(75) Inventors: Sadayuki Watanabe, Nagano (JP); Yasushi Sakai, Nagano (JP)

(73) Assignee: Fuji Electric Co., Ltd. (JP)

( * ) Notice: Subject to any disclaimer, the term of this patent is extended or adjusted under 35 U.S.C. 154(b) by 354 days.

(21) Appl. No.: 10/390,332

(22) Filed: Mar. 17, 2003

(65) Prior Publication Data
US 2004/0000374 A1 Jan. 1, 2004

(30) Foreign Application Priority Data
Mar. 19, 2002 (JP) .............................. 2002-077024

(51) Int. Cl.
*G11B 5/66* (2006.01)
(52) U.S. Cl. ................... 427/126.3; 427/128; 427/129; 427/132; 428/846
(58) Field of Classification Search ................ 156/150; 427/123, 126.3, 127, 128, 129, 132; 428/64.2, 428/65.3, 65.4, 65.5, 65.7, 65.8, 694 SC, 428/694 NF, 694 XS, 846
See application file for complete search history.

(56) References Cited

U.S. PATENT DOCUMENTS

| 5,942,342 | A | 8/1999 | Hikosaka et al. |
| 6,174,597 | B1 * | 1/2001 | Yusu et al. .................. 428/332 |
| 6,221,508 | B1 | 4/2001 | Kanbe et al. |
| 6,673,475 | B1 * | 1/2004 | Oikawa et al. ........... 428/694 T |
| 6,696,172 | B1 * | 2/2004 | Oikawa et al. ............. 428/611 |
| 6,794,028 | B1 * | 9/2004 | Uwazumi et al. ........... 428/336 |
| 2003/0064253 | A1 * | 4/2003 | Uwazumi et al. ...... 428/694 TP |
| 2003/0152809 | A1 * | 8/2003 | Oikawa et al. ......... 428/694 TS |

FOREIGN PATENT DOCUMENTS

| EP | 0 945 858 A1 | 3/1999 |
| JP | 2001043526 A | * 2/2001 |

* cited by examiner

*Primary Examiner*—John T. Haran
(74) *Attorney, Agent, or Firm*—Rossi, Kimms & McDowell, LLP

(57) ABSTRACT

A perpendicular magnetic recording medium has a magnetic recording layer with ferromagnetic crystalline grains and nonmagnetic and nonmetallic grain boundary region surrounding the grains. The surface of its underlayer, before forming the magnetic recording layer, is exposed to an $O_2$ or $N_2$ atmosphere or an atmosphere of rare gas and $O_2$ or $N_2$, to attach the $O_2$ or $N_2$ as nucleation sites for promoting growth of the nonmagnetic and nonmetallic region. By forming the magnetic recording layer thereafter, both ferromagnetic crystalline grains and the nonmagnetic and nonmetallic grain boundary region are formed from the initial stage of the growth of the magnetic recording layer. Thus, a magnetic recording layer having excellent segregation structure can be formed.

19 Claims, 2 Drawing Sheets

METHOD OF PRODUCING A MAGNETIC RECORDING MEDIUM AND A MAGNETIC RECORDING MEDIUM FORMED THEREBY

BACKGROUND

A perpendicular magnetic recording system with recording magnetization perpendicular to the medium surface has been contemplated as an alternative to a conventional longitudinal magnetic recording system, to attain higher recording density. A perpendicular magnetic recording medium is principally composed of a magnetic recording layer of a hard magnetic material, an underlayer for aligning the magnetic recording layer to an aimed direction, a protective layer for protecting the surface of the magnetic recording layer, and an underlayer of a soft magnetic material having a function to converge a magnetic flux that is generated by a magnetic head for recording in the magnetic layer.

The soft magnetic underlayer can be omitted since recording is possible without it, although it can improve media performance. A medium without the soft magnetic underlayer is called a single-layered perpendicular magnetic recording medium, and a medium having the soft magnetic underlayer is called a double-layered perpendicular magnetic recording medium. A perpendicular magnetic recording medium, as well as a longitudinal magnetic recording medium, must perform high thermal stability compatible with low media noise in order to achieve high recording density.

In conventional longitudinal magnetic recording media, various compositions and structures of a magnetic recording layer and materials for a nonmagnetic underlayer have been proposed. Practical magnetic recording layers use an alloy of Co and Cr (hereinafter referred to as CoCr) and obtain magnetically isolated magnetic grains by segregating the chromium at the grain boundary. Another type of a magnetic recording layer, called a granular magnetic recording layer that uses nonmagnetic and nonmetallic substance, such as oxide or nitride, has been proposed.

In a magnetic recording layer of the CoCr, the substrate must be heated to a temperature higher than 200° C. during the deposition of the layer to sufficiently segregate the chromium. On the other hand, the granular magnetic recording layer has a feature where the nonmagnetic and nonmetallic substance segregates even if the substrate heating is omitted. The magnetic recording layer of CoCr and the granular magnetic recording layer can be applied to a perpendicular magnetic recording medium as well, establishing perpendicular anisotropy by controlling crystal alignment in the recording layer with the aid of an underlayer, for example.

In a perpendicular magnetic recording medium, however, it is equally difficult to segrate chromium in the magnetic recording layer using CoCr as in a longitudinal magnetic recording medium. On the hand, a perpendicular magnetic recording layer employing a granular magnetic layer makes chromium separation easier than in the CoCr recording layer. As a result, magnetic interaction between the grains can be suppressed, leading to low media noise. However, the granular magnetic recording layer in a thin film thickness of about 10 nm or less does not give sufficient segregation structure, resulting in poor isolation between grains, and causing media noise.

Because recording in a perpendicular magnetic recording medium is ideally done with a sharp perpendicular magnetic field induced by a magnetic recording head, it is desirable to form the magnetic recording layer as thin as possible. If an initial growth layer with such insufficient segregation is formed, it is difficult to obtain a useful thin magnetic recording layer. Consequently, lower noise and higher recording density have not been attained with granular magnetic recording layers.

Accordingly, there is a need to develop a perpendicular magnetic recording medium that exhibits low noise and high recording density by achieving excellent segregation structure in the magnetic layer. The present invention addresses this need.

SUMMARY OF THE INVENTION

The present invention relates to a method of producing a perpendicular magnetic recording medium and to a perpendicular magnetic recording medium produced thereby. Such a perpendicular magnetic recording medium is suitable for mounting on a variety of magnetic recording devices.

One aspect of the present invention is a method of producing a perpendicular magnetic recording medium comprising the steps of sequentially laminating an underlayer, a magnetic recording layer, a protective layer, and a liquid lubricant layer on a nonmagnetic substrate. The magnetic recording layer comprises ferromagnetic crystalline grains and nonmagnetic grain boundary region comprised mainly of oxide or nitride surrounding the crystalline grains. The laminated underlayer is exposed to an atmosphere containing $O_2$ or $N_2$ before laminating the magnetic recording layer. The atmosphere can contain rare gas.

The underlayer can be composed of Ru or an alloy of Ru, which can be RuW, RuCu, RuC, RuB, or RuCoCr. A seed layer can be laminated before laminating the underlayer. The seed layer can be composed of a Ni-base alloy, which can be NiFe, NiFeNb, NiFeB, NiFeSi, or NiFeCr. If a seed layer is used, a soft magnetic underlayer can be laminated before the seed layer. The soft magnetic underlayer can be composed of crystalline materials of a NiFe alloy and a Sendust alloy (FeSiAl), fine crystalline materials of FeTaC and CoTaZr, or an amorphous cobalt alloy of CoZrNb.

Another aspect of the present invention is a perpendicular magnetic recording medium produced by the method above.

DETAILED DESCRIPTION

Both the magnetic portion and the nonmagnetic and nonmetallic grain boundary region can be simultaneously formed from the initial stage of the recording layer formation, and the ferromagnetic crystalline grains can be magnetically separated. Specifically, an oxide or a nitride can form a nonmagnetic and nonmetallic underlayer. The underlayer is exposed to an atmosphere containing $O_2$ or $N_2$ before depositing the granular magnetic recording layer onto the underlayer. The $O_2$ or $N_2$ attached on the substrate surface with the underlayer can act as nucleation sites to grow the nonmagnetic and nonmetallic region causing separation of ferromagnetic crystalline grains from the initial growth layer of the magnetic recording layer.

Figure 1:
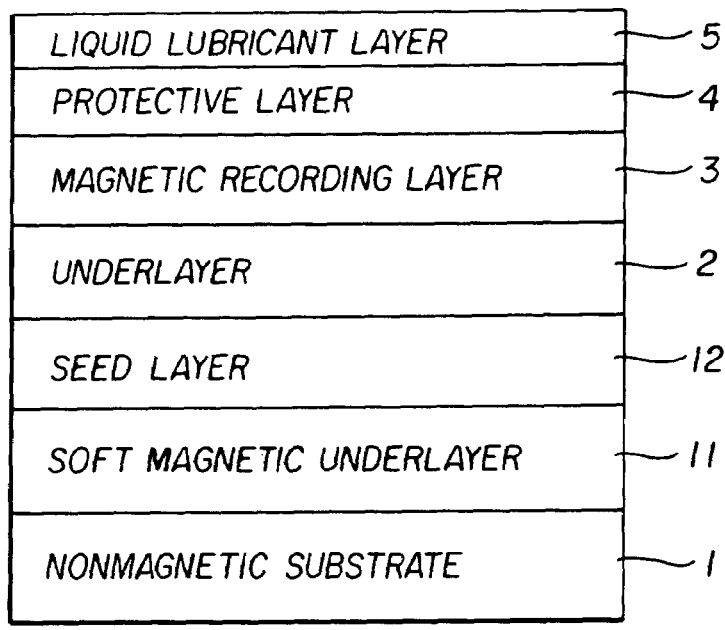
FIG. 1 is a schematic cross-sectional view illustrating an example of embodiment of a perpendicular magnetic recording medium according to the present invention.

Some aspects of preferred embodiments of the present invention will be described with reference to the accompanied drawings in the following. FIG. 1 is a schematic cross-sectional view illustrating an example of embodiment of a perpendicular magnetic recording medium according to the present invention. The perpendicular magnetic recording medium has a structure comprising at least an underlayer 2, a magnetic layer 3, and a protective layer 4 sequentially formed on a nonmagnetic substrate 1. A liquid lubricant layer 5 is further formed on the layers.

The nonmagnetic substrate 1 can be composed of a NiP-plated aluminum alloy, strengthened glass, or crystallized glass, which are currently being used in a conventional magnetic recording medium. A plastic substrate made of a resin, such as polycarbonate, polyolefin, or the like, also can be used when a temperature of substrate heating is held under about 100° C.

The underlayer 2 is preferably composed of a metal with a hexagonal closest packed (hcp) structure or an alloy of such a metal, or a metal with a face centered cubic (fcc) structure or an alloy of such a metal. The metal with the hcp structure includes Ti, Zr, Ru, Zn, Tc, and Re. The metal with the fcc structure includes Cu, Rh, Pd, Ag, Ir, Pt, Au, Ni, and Co. Of the materials exemplified above, Ru or Ru alloy exhibits excellent effect because of weak reactivity when exposed to $O_2$ or $N_2$. Although a thin film is desirable, a thickness at least 3 nm is preferable, which thickness of crystal growth provides acceptable mass or structure.

A seed layer 12 can be provided beneath the underlayer 2 to improve alignment of the underlayer 2. Although the seed layer can be nonmagnetic, a material with soft magnetic property is preferable for acting as a part of a soft magnetic underlayer in a structure of a double-layered perpendicular magnetic recording medium. Examples of the material of the seed layer 12 exhibiting soft magnetic property include nickel-base alloys such as NiFe, NiFeNb, NiFeB, NiFeSi, and NiFeCr.

If a seed layer 12 is provided under the underlayer 2, a soft magnetic underlayer 11 can be further provided under the seed layer for converging the magnetic field generated by a magnetic head to construct a double-layered perpendicular magnetic recording medium. Materials that can be used for the soft magnetic underlayer 11 include crystalline materials of a NiFe alloy and a Sendust alloy (FeSiAl), fine crystalline materials of FeTaC and CoTaZr, and an amorphous cobalt alloy of CoZrNb.

While the optimum thickness of the soft magnetic underlayer 11 depends on the structure and characteristic of a magnetic head used for recording, a thickness from 10 nm to 500 nm is desirable considering a balance with productivity.

The magnetic recording layer 3 has a structure composed of ferromagnetic crystalline grains and a nonmagnetic grain boundary region surrounding the grains. The magnetic recording layer employs a granular magnetic recording layer, in which the magnetic grain boundary region is composed of nonmagnetic nonmetallic substance. The ferromagnetic crystalline grains are preferably composed of a CoPt alloy, an FePt alloy, or one of these alloys that contains additive element(s) selected from Cr, Ni, Nb, Ta, and B.

The nonmagnetic metallic substance of the nonmagnetic grain boundary region is preferably an oxide or a nitride, for example, an oxide or a nitride of an element selected from Cr, Co, Si, Al, Ti, Ta, Hf, Zr, Y, and Ce. The ferromagnetic crystalline grains need to exhibit magnetic anisotropy perpendicular to the film surface in order to be used in a perpendicular magnetic recording medium.

The substrate surface before forming the magnetic recording layer 3, namely the surface of the underlayer 2, is exposed to an atmosphere of $O_2$ or $N_2$, or to an atmosphere containing $O_2$ or $N_2$. The atmosphere can include rare gas. The $O_2$ or $N_2$ is attached as nucleation sites for growing the nonmagnetic nonmetallic region. After that, the magnetic recording layer 3 is formed. As a result, both the ferromagnetic crystalline grains and the grain boundary region of the nonmagnetic nonmetallic substance are formed from the initial stage of the magnetic layer formation. Thus, a magnetic recording layer having excellent segregation structure can be formed.

The protective layer 4 can be composed of a thin film of mainly carbon. The liquid lubricant layer 5 can be formed of perfluoropolyether lubricant.

The following describes specific examples of embodiments of perpendicular magnetic recording media according to the present invention.

In the first Example, the nonmagnetic substrate used was a chemically strengthened glass substrate with smooth surface (N-5 glass substrate, manufactured by HOYA Corporation). After cleaning, the substrate was introduced into a sputtering apparatus. A soft magnetic underlayer of CoZrNb 300 nm thick was formed using a target of Co-5Zr9Nb under argon gas pressure of 5 mTorr. Subsequently, a seed layer of NiFeNb 20 nm thick was deposited using a soft magnetic Ni-base alloy target of Ni-12Fe9Nb under argon gas pressure of 5 mTorr. Then, an underlayer of Ru 20 nm thick was formed using a Ru target under argon gas pressure of 30 mTorr. After that, the resulting substrate was exposed to an argon gas atmosphere containing 2% of $O_2$ for 10 sec. The pressure of the gas mixture of argon and oxygen was 5 mTorr, and the flow rate was 60 sccm.

Then, a magnetic recording layer of CoCrPt—$SiO_2$ was deposited using a target of 91(Co-10Cr17Pt)-9$SiO_2$ under argon gas pressure of 30 mTorr. The thickness of the magnetic recording layer was varied in the range of 10 to 30 nm. After depositing a carbon protective film 8 nm thick using a carbon target, the resulting substrate was taken out from the vacuum chamber.

Finally, a liquid lubricant layer 2 nm thick was formed of perfluoropolyether by means of a dip-coating method. Thus, a double-layered perpendicular magnetic recording medium was produced. Deposition of the magnetic recording layer was conducted by means of an RF magnetron sputtering method; deposition of all other layers was conducted by means of a DC magnetron sputtering method.

In the second Example, a double-layered perpendicular magnetic recording medium was produced in the same manner as in Example 1, except that the underlayer and magnetic recording layer were formed with a RuW underlayer 15 nm thick, exposing to an atmosphere of argon containing 3% of $N_2$ for 10 sec, and a magnetic recording layer of CoCrPt—SiN using a 92(Co-10Cr15Pt)-8SiN target.

As a first Comparative Example, a double-layered perpendicular magnetic recording medium was produced in the same manner as in Example 1, except that the Ar+$O_2$ atmosphere exposure before forming the CoCrPt—SiO$_2$ magnetic recording layer was omitted.

As a second Comparative Example, a double-layered perpendicular magnetic recording medium was produced in the same manner as in Example 2, except that the Ar+N$_2$ atmosphere exposure before forming the CoCrPt—SiN magnetic recording layer was omitted.

Results of magnetic property evaluation for the Examples and Comparative Examples are described below. The magnetic performance was measured by magnetic Kerr effect. Table 1 shows coercivity He for the magnetic recording layers having a thickness of 15 nm. Specifically, Table 1 gives the coercivity He for the magnetic recording layers having thickness of 15 nm obtained from magnetic property evaluation on Examples 1 and 2 and Comparative Examples 1 and 2.

TABLE 1

|  | Hc [Oe] |
|---|---|
| Example 1 | 4,320 |
| Example 2 | 3,460 |
| Comp Example 1 | 4,000 |
| Comp Example 2 | 3,200 |

Thickness of magnetic recording layer: 15 nm

Squareness ratio S for every Examples and Comparative Examples was 1.0. Comparing Example 1 with Comparative Example 1, the Example 1, which experienced the exposure to the Ar+O$_2$ atmosphere, demonstrated improvement in He as compared to the Comparative Example 1, which did not experience the exposure. Similarly, comparing Example 2 with Comparative Example 2, the Example 2, which experienced the exposure to the Ar+N$_2$ atmosphere, showed improvement in He. Thus, the exposure to the atmosphere containing O$_2$ or N$_2$ promoted segregation structure and contributed to improvement in He.

Figure 2:
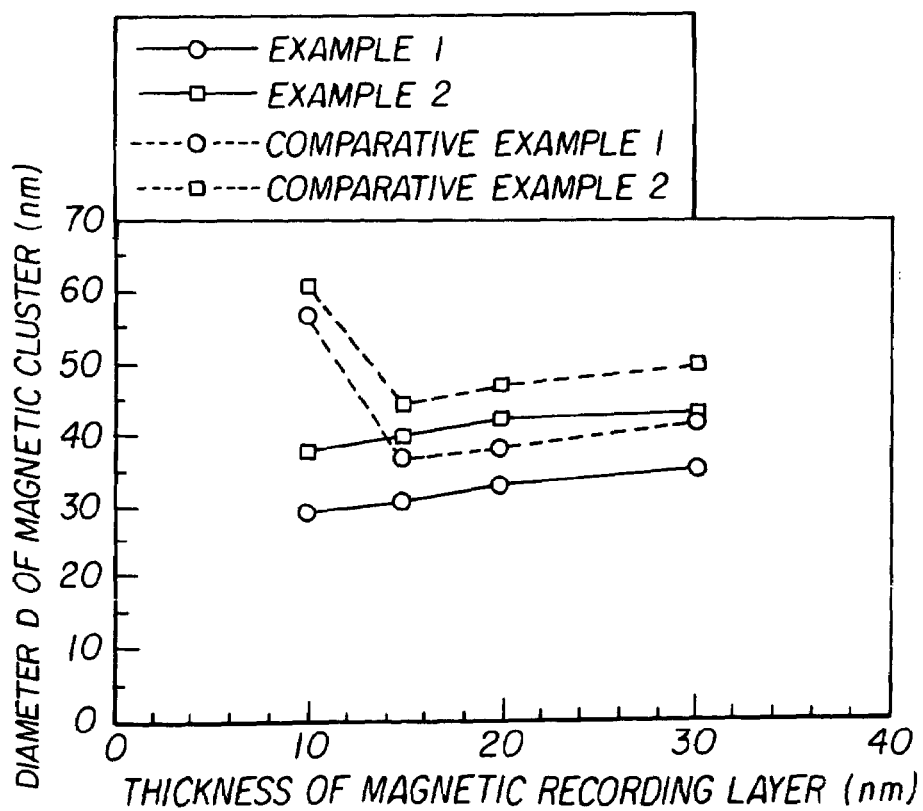
FIG. 2 is a chart showing dependence of magnetic cluster size on the magnetic recording layer thickness obtained from MFM evaluation for Examples 1 and 2 and Comparative Examples 1 and 2.
Figure 3:
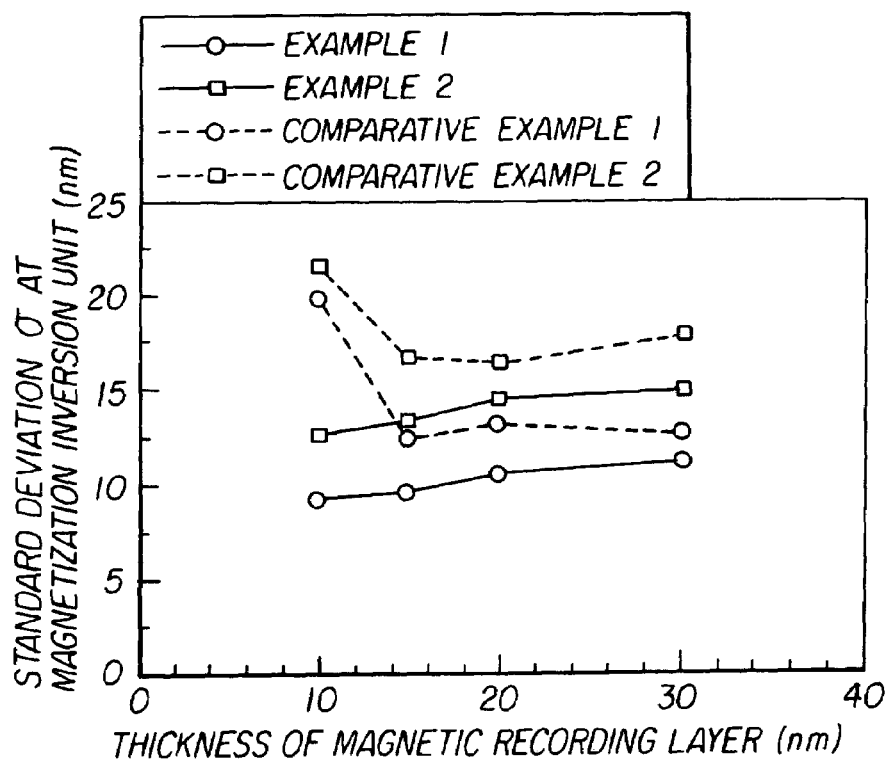
FIG. 3 is a chart showing dependence of standard deviation of magnetic cluster size on the magnetic recording layer thickness obtained from MFM evaluation for Examples 1 and 2 and Comparative Examples 1 and 2.

FIG. 2 and FIG. 3 show dependences of a diameter d [nm] and a standard deviation of the diameter σ [nm], respectively, of a magnetic cluster size on the thickness of the magnetic recording layer for Examples and Comparative Examples. The values of magnetic cluster size were obtained by MFM measurement for each of the AC-demagnetized media. It is generally apparent that both Examples 1 and 2, which were subjected to the exposure, significantly decreased both d and σ as compared to Comparative Examples 1 and 2, which did not experience the exposure.

Focusing on the case of 10 nm thickness of the magnetic recording layer in particular, in Comparative Examples 1 and 2, both the diameter d and the standard deviation σ are substantially larger in comparison, which indicates that separation of the ferromagnetic crystalline grains was insufficient in the initial growth layer, resulting in the large values of the magnetic cluster sizes and the deviations thereof.

Examples 1 and 2, which were subjected to the exposure, in contrast, both the diameter d and the standard deviation σ are small even at the thickness of 10 nm of the magnetic recording layer, which indicates that O$_2$ or N$_2$ acted as nucleation sites for the growth of the nonmagnetic nonmetallic region and promoted separation of the ferromagnetic crystalline grains from the initial stage of the growth of the magnetic recording layer.

Figure 4:
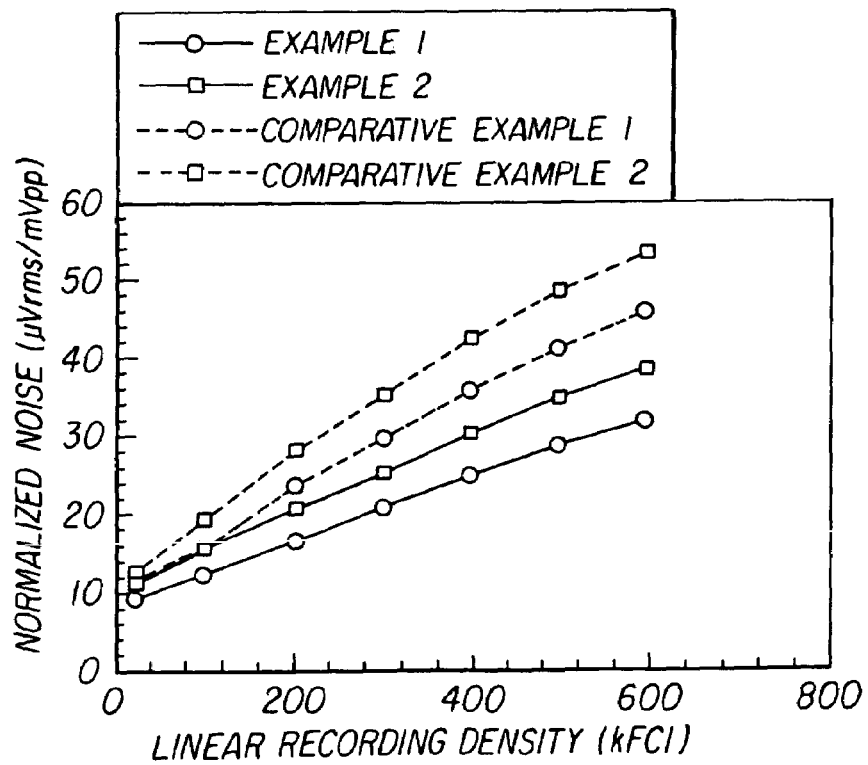
FIG. 4 is a chart showing dependence of the normalized media noise in the case of the magnetic recording layer thickness of 15 nm on linear recording density obtained from the evaluation of magnetic parametric performance for Examples 1 and 2 and Comparative Examples 1 and 2.

FIG. 4 shows dependence of normalized media noises on linear recording density, obtained from measurement of magnetic parametric performance for 15 nm thickness of the magnetic recording layer in the Examples and the Comparative Examples. The magnetic parametric performance was obtained by the measurement using a spin-stand tester equipped with a GMR head. As is apparent from FIG. 4, the media noise significantly decreased in Examples 1 and 2, which were subjected to the exposure, as compared to Comparative Examples 1 and 2, which did not experience the exposure. Considering in combination with the above-described evaluation results on the magnetic cluster size, the noise reduction has been attained by virtue of sufficient separation of the magnetic crystalline grains from the initial stage of the growth of the magnetic recording layer, which in turn resulted from the exposure.

Table 2 shows SNR values at 400 kFCI and 600 kFCI for the magnetic recording layer thickness of 15 nm, obtained from evaluation on the magnetic parametric performance for Examples 1 and 2 and Comparative Examples 1 and 2.

TABLE 2

|  | SNR[dB] at 400 [kFCI] | SNR[dB] at 600 [kFCI] |
|---|---|---|
| Example 1 | 16.6 | 4.32 |
| Example 2 | 12.4 | 1.86 |
| Comp Example 1 | 10.9 | 0.69 |
| Comp Example 2 | 9.5 | 0.33 |

Thickness of magnetic recording layer: 15 nm

The SNRs were obtained from the similar evaluation of the magnetic parametric performance to in the case of the above-described normalized media noise. Reflecting the high Hc and low noise described above, the SNR in the Examples 1 and 2, which were subjected to the exposure, demonstrated substantial improvement as compared to Comparative Examples 1 and 2, which did not experience the exposure.

By introducing nucleation sites on the surface on which a granular magnetic recording layer is to be formed, for the purpose of promoting growth of a nonmagnetic and nonmetallic grain boundary phase, the ferromagnetic crystalline grains can be separated from the initial growth layer of the magnetic layer. The effect results from the constitution of the invention in which a granular magnetic recording layer is used comprising nonmagnetic grain boundary region of nonmagnetic and nonmetallic oxide or nitride, and exposing the substrate surface with an underlayer before forming the magnetic layer to an atmosphere containing O$_2$ or N$_2$ to introduce nucleation sites for the growth of the nonmagnetic and nonmetallic region. Accordingly, magnetic interaction between the ferromagnetic crystalline grains decreases to reduce media noise, and at the same time, to attain a thin magnetic layer. Therefore, high recording density can be accomplished in a perpendicular magnetic recording medium according to the present invention.

Given the disclosure of the present invention, one versed in the art would appreciate that there may be other embodiments and modifications within the scope and spirit of the present invention. Accordingly, all modifications and equivalents attainable by one versed in the art from the present disclosure within the scope and spirit of the present invention are to be included as further embodiments of the present invention. The scope of the present invention accordingly is to be defined as set forth in the appended claims.

The disclosure of the priority application, JP PA 2002-077024, in its entirety, including the drawings, claims, and the specification thereof, is incorporated herein by reference.

What is claimed is:

1. A method of producing a perpendicular magnetic recording medium comprising the steps of:

forming an underlayer over a nonmagnetic substrate;
attaching $O_2$ or $N_2$ to the underlayer after the underlayer has been fully formed; and then
forming a magnetic recording layer on the underlayer, wherein the magnetic recording layer comprises ferromagnetic crystalline grains and nonmagnetic grain boundary region composed mainly of oxide or nitride surrounding the crystalline grains.

2. A method of producing a perpendicular magnetic recording medium according to claim 1, wherein the $O_2$ or $N_2$ is attached to the underlayer in an atmosphere-containing a rare gas.

3. A method of producing a perpendicular magnetic recording medium according to claim 1, wherein the underlayer is composed of Ru or a Ru alloy.

4. A method of producing a perpendicular magnetic recording medium according to claim 3, wherein the Ru alloy is RuW, RuCu, RuC, RuB, or RuCoCr.

5. A method of producing a perpendicular magnetic recording medium according to claim 1, further comprising the step of forming a seed layer before forming the underlayer, the seed layer being composed of a Ni-base alloy.

6. A method of producing a perpendicular magnetic recording medium according to claim 5, wherein the Ni-base alloy is NiFe, NiFeNb, NiFeB, NiFeSi, or NiFeCr.

7. A method of producing a perpendicular magnetic recording medium according to claim 5, further comprising the step of forming a soft magnetic underlayer.

8. A method of producing a perpendicular magnetic recording medium according to claim 7, wherein the soft magnetic underlayer is composed of crystalline materials of a NiFe alloy and a Sendust alloy (FeSiAl), fine crystalline materials of FeTaC and CoTaZr, or an amorphous cobalt alloy of CoZrNb.

9. A method of producing a perpendicular magnetic recording medium according to claim 1, wherein the underlayer is crystalline having a face centered cubic structure or hexagonal closest packed structure.

10. A method of producing a perpendicular magnetic recording medium according to claim 1, further comprising the steps of forming a protective layer on the magnetic recording layer, and then forming a liquid lubricant layer on the protective layer.

11. A method of producing a perpendicular magnetic recording medium according to claim 1, wherein the $O_2$ or $N_2$ is attached to the underlayer by exposing the underlayer to an argon gas containing $O_2$ or $N_2$ for 10 seconds.

12. A perpendicular magnetic recording medium produced by the method according to claim 1.

13. A perpendicular magnetic recording medium produced by the method according to claim 2.

14. A perpendicular magnetic recording medium produced by the method according to claim 3.

15. A perpendicular magnetic recording medium produced by the method according to claim 4.

16. A perpendicular magnetic recording medium produced by the method according to claim 5.

17. A perpendicular magnetic recording medium produced by the method according to claim 6.

18. A perpendicular magnetic recording medium produced by the method according to claim 7.

19. A perpendicular magnetic recording medium produced by the method according to claim 8.

* * * * *